United States Patent
Iwamura et al.

(10) Patent No.: US 8,830,928 B2
(45) Date of Patent: Sep. 9, 2014

(54) MOBILE COMMUNICATION METHOD AND RADIO BASE STATION

(75) Inventors: Mikio Iwamura, Tokyo (JP); Ivan Cosovic, Dusseldorf (DE)

(73) Assignee: NTT DoCoMo, Inc., Tokyo (JP)

( * ) Notice: Subject to any disclaimer, the term of this patent is extended or adjusted under 35 U.S.C. 154(b) by 147 days.

(21) Appl. No.: 13/146,040

(22) PCT Filed: Jan. 26, 2010

(86) PCT No.: PCT/JP2010/050960
§ 371 (c)(1),
(2), (4) Date: Dec. 2, 2011

(87) PCT Pub. No.: WO2010/084987
PCT Pub. Date: Jul. 29, 2010

(65) Prior Publication Data
US 2012/0069803 A1 Mar. 22, 2012

(30) Foreign Application Priority Data
Jan. 26, 2009 (JP) .................. 2009-014491

(51) Int. Cl.
*H04W 4/00* (2009.01)
*H04W 72/12* (2009.01)

(52) U.S. Cl.
CPC ...... *H04W 72/1278* (2013.01); *H04W 72/1263* (2013.01)
USPC ........... 370/329; 370/252; 370/328; 370/335; 370/348; 455/273; 455/444; 455/525; 455/509; 455/448; 375/260

(58) Field of Classification Search
USPC ....................................... 370/329
See application file for complete search history.

(56) References Cited

U.S. PATENT DOCUMENTS 7,974,652 B2 * 7/2011 Gerlach et al. ............... 455/522
8,379,580 B2 * 2/2013 Goto et al. .................. 370/329

(Continued)

FOREIGN PATENT DOCUMENTS

| JP | 4-91522 A | 3/1992 |
| JP | 2000-308124 A | 11/2000 |
| JP | 2003-259413 A | 9/2003 |
| JP | 2009-267815 A | 11/2009 |

OTHER PUBLICATIONS

Office Action for Japanese Patent Application No. 2009-014491 mailed Jul. 31, 2012, with English translation thereof (4 pages).

(Continued)

*Primary Examiner* — Faruk Hamza
*Assistant Examiner* — Shah R Zaman
(74) *Attorney, Agent, or Firm* — Osha Liang LLP

(57) ABSTRACT

A mobile communication method according to the present invention includes the steps of: (A) notifying, from a first radio base station (MBS) to a second radio base station (FBS), scheduling information including information specifying a radio resource for a control channel through which a first mobile station (MUE) that is in communication in a first cell under the control of the first radio base station (MBS) transmits downlink control information or uplink control information, when the first radio base station (MBS) assigns the radio resource; and (B) assigning, at the second radio base station (FBS), a radio resource for a control channel through which a second mobile station that is in communication in a second cell under the control of the second radio base station (FBS) transmits downlink control information or uplink control information based on the scheduling information.

6 Claims, 8 Drawing Sheets

(56) References Cited

U.S. PATENT DOCUMENTS

| | | | |
|---|---|---|---|
| 2004/0146017 A1* | 7/2004 | Aoyama | 370/329 |
| 2006/0250935 A1* | 11/2006 | Hamamoto et al. | 370/203 |
| 2007/0097938 A1* | 5/2007 | Nylander et al. | 370/338 |
| 2009/0129354 A1* | 5/2009 | Gupta et al. | 370/338 |
| 2009/0264077 A1* | 10/2009 | Damnjanovic | 455/63.1 |
| 2010/0151873 A1* | 6/2010 | Gorokhov et al. | 455/452.1 |
| 2011/0151913 A1* | 6/2011 | Forster et al. | 455/509 |
| 2011/0165878 A1* | 7/2011 | Nylander et al. | 455/436 |
| 2011/0223923 A1* | 9/2011 | Cho et al. | 455/448 |
| 2012/0064907 A1* | 3/2012 | Jung et al. | 455/452.1 |
| 2014/0011507 A1* | 1/2014 | Bhattad et al. | 455/450 |

OTHER PUBLICATIONS

Office Action for Japanese Patent Application No. 2009-014491 mailed Oct. 23, 2012, with English translation thereof (4 pages).

International Search Report w/translation from PCT/JP2010/050960 dated Mar. 23, 2010 (4 pages).

3GPP TS 36.300 V8.7.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Dec. 2008 (144 pages).

* cited by examiner

FIG. 6

```
-- PHICH-Configuration
The IE PHICH-Configuration is used to specify the PHICH configuration.
              PHICH-Configuration information element

-- ASN1START

PHICH-Configuration ::=    SEQUENCE {
    phich-Duration            ENUMERATED { normal, extended },
    phich-Resource            ENUMERATED { oneSixth, half, one, two }
}

-- ASN1STOP
```

| PHICH-Configuration field descriptions |
|---|
| phich-Duration<br>Parameter: PHICH-Duration, see TS 36.211, 6.9.3. Table 6.9.3-1 provides duration for MBSFN and non-MBSFN subframes. |
| phich-Resource<br>Parameter: Ng, see TS 36.211, 6.9. OneSixth, half, one, two correspond to $N_g \in \{1/6, 1/2, 1, 2\}$ |

MOBILE COMMUNICATION METHOD AND RADIO BASE STATION

TECHNICAL FIELD

The present invention relates to a mobile communication method and a radio base station.

BACKGROUND ART

As illustrated in FIG. 10, it is considered to introduce an operation of a mobile communication system in which a macro radio base station MBS (Macro Base Station, also referred to as "eNodeB" or "eNB") and a femto radio base station FBS (Femto Base Station, also referred to as "HeNB" or "HNB") are mixed.

In this case, a mobile station that communicates with the macro radio base station MBS is referred to as "macro mobile station MUE (Macro User Equipment)" and a mobile station that communicates with the femto radio base station FBS is referred to as "femto mobile station FUE (Femto User Equipment)".

Further, a cell under the control of the femto radio base station FBS may also be referred to as "CSG (Closed Subscriber Group) cell". In the CSG cell, connection is permitted only to a specific mobile station belonging to the CSG. An example therefor is that the CSG is set to each family and only the family is permitted to connect to the CSG cell installed at their home. In the CSG cell, the mobile station to which the connection is permitted is limited to the CSG member. Given this fact, it is easily imaged a case where a mobile station with no access right to the CSG cell is present in the vicinity of the CSG cell and a communication is performed by connecting to another cell, e.g., a cell under the control of the macro radio base station MBS.

Thus, in an environment where the femto radio base station FBS and the macro radio base station MBS are mixed, there is a case where the macro mobile station MUE exists within the coverage of the femto radio base station FBS.

However, the above-described mobile communication system has a problem in that when the macro radio base station MBS and the femto radio base station FBS are operated in the same frequency band, it is probable that a significant quality deterioration or a capacity decrease occur.

Particularly, when the macro mobile station MUE is present in the vicinity of the femto radio base station FBS, interference between the macro mobile station MUE and the femto radio base station FBS is a problem.

Particularly, when the macro mobile station MUE does not have the access right to the CSG cell under the control of the femto radio base station FBS and performs a notification in the immediate vicinity of the femto radio base station FBS, an interference between the macro mobile station MUE and the femto radio base station FBS is a serious problem.

In the example of FIG. 10, even in the case of the macro mobile stations MUE1 and MUE2 connecting to the same macro radio base station MBS, the interference between the macro mobile station MUE 2 and the femto radio base station FBS is not a serious problem because the distance between the two is large; however, the interference between the macro mobile station MUE1 and the femto radio base station FBS is a serious problem because the distance between the two is small.

For example, when the macro mobile station MUE1 transmits an uplink signal, if the femto mobile station FUE transmits an uplink signal at the same time by using the same radio resource, then the femto radio base station FBS experiences the interference from the macro mobile station MUE1 and thus it is probable that the uplink signal from the femto mobile station FUE cannot be correctly received.

Similarly, when the macro mobile station MUE1 receives a downlink signal from the macro radio base station MBS, if the femto radio base station FBS transmits the downlink signal to the femto mobile station FUE at the same time by using the same radio resource, then it is probable that the macro mobile station MUE1 cannot correctly receive the downlink signal from the macro radio base station MBS.

Therefore, the present invention is intended to overcome the above-described problem. An object of the present invention is to provide a mobile communication method and a radio base station, capable of inhibiting an influence of an interference in a mobile communication system where a macro radio base station MBS (first radio base station) and a femto radio base station FBS (second radio base station) are mixed.

SUMMARY OF THE INVENTION

A first aspect of the present invention is summarized as a mobile communication method, including the steps of: (A) notifying, from a first radio base station to a second radio base station, scheduling information including information specifying a radio resource for a control channel through which a first mobile station that is in communication in a first cell under the control of the first radio base station transmits downlink control information or uplink control information, when the first radio base station assigns the radio resource; and (B) assigning, at the second radio base station, a radio resource for a control channel through which a second mobile station that is in communication in a second cell under the control of the second radio base station transmits downlink control information or uplink control information based on the scheduling information.

A second aspect of the present invention is summarized as a radio base station that functions as a first radio base station in a mobile communication system in which the first radio base station and a second radio base station are mixed, including: a radio resource assignment unit configured to assign a radio resource for a control channel through which downlink control information or uplink control information is transmitted to the first mobile station that is in communication in a first cell under the control of the first radio base station; and a notification unit configured to notify, to the second radio base station, scheduling information including information specifying the radio resource assigned by the radio resource assignment unit.

A third aspect of the present invention is summarized as a radio base station that functions as a second radio base station in a mobile communication system in which a first radio base station and the second radio base station are mixed, including: a scheduling information reception unit configured to receive scheduling information including information specifying a radio resource from the first radio base station, when the first radio base station assigns a radio resource for a control channel through which the first mobile station that is in communication in a first cell under the control of the first radio base station transmits downlink control information or uplink control information; and a radio resource assignment unit configured to assign a radio resource for a control channel through which the second mobile station that is in communication in a second cell under the control of the second radio base station transmits downlink control information or uplink control information, based on the scheduling information.

As described above, according to the present invention, it is possible to provide a mobile communication method and a radio base station, capable of inhibiting an influence of an interference in a mobile communication system where a macro radio base station MBS (first radio base station) and a femto radio base station FBS (second radio base station) are mixed.

BRIEF DESCRIPTION OF THE DRAWINGS

FIG. 6 is a diagram explaining one example of "PHICH Configuration" included in MBS assignment radio resource information notified to a femto radio base station from the macro radio base station according to the first embodiment of the present invention.

DETAILED DESCRIPTION (Mobile Communication System According to First Embodiment of the Present Invention)

With reference to FIG. 1 to FIG. 8, the configuration of a mobile communication system according to a first embodiment of the present invention will be explained.

Figure 1:
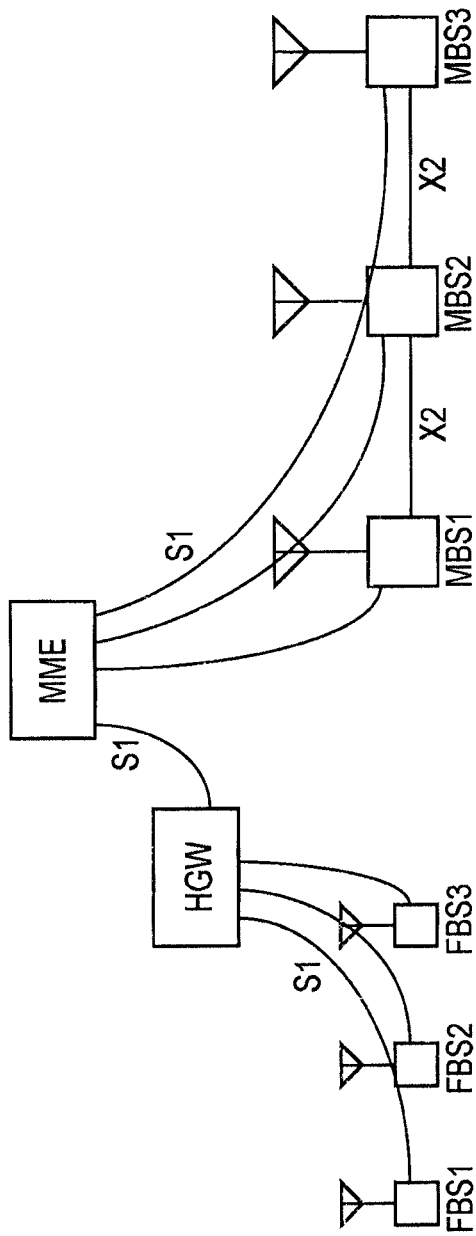
FIG. 1 is a diagram showing the entire configuration of a mobile communication system according to a first embodiment of the present invention.

As illustrated in FIG. 1, the mobile communication system according to this embodiment includes: macro radio base stations MBS1 to MBS3; femto radio base stations FBS1 to FBS3; a gateway apparatus HGW (Home eNB Gateway) that collectively controls the femto radio base stations FBS1 to FBS3; and a mobile switching center MME (Mobility Management Equipment) that collectively controls the macro radio base stations MBS1 to MBS3 and is connected to the gateway apparatus HGW.

The femto radio base stations FBS1 to FBS3 and the gateway apparatus HGW are connected by an S1 interface, the gateway apparatus HGW and the mobile switching center MME are connected by an S1 interface, the macro radio base stations MBS1 to MBS3 and the mobile switching center MME are connected by an S1 interface, and the macro radio base stations MBS1 to MBS3 are connected with each other by an X2 interface.

In this case, the femto radio base stations FBS1 to FBS3 may be connected with each other by an X2 interface. Further, the femto radio base stations FBS1 to FBS3 and the mobile switching center MME may be connected by the S1 interface without the gateway apparatus HGW therebetween.

Hereinafter, with reference to FIG. 2, the configuration of the macro radio base stations MBS1 to MBS3 will be explained. In this case, the macro radio base stations MBS1 to MBS3 are basically the same in configuration, and are explained collectively as a macro radio base station MBS (first radio base station).

Figure 2:
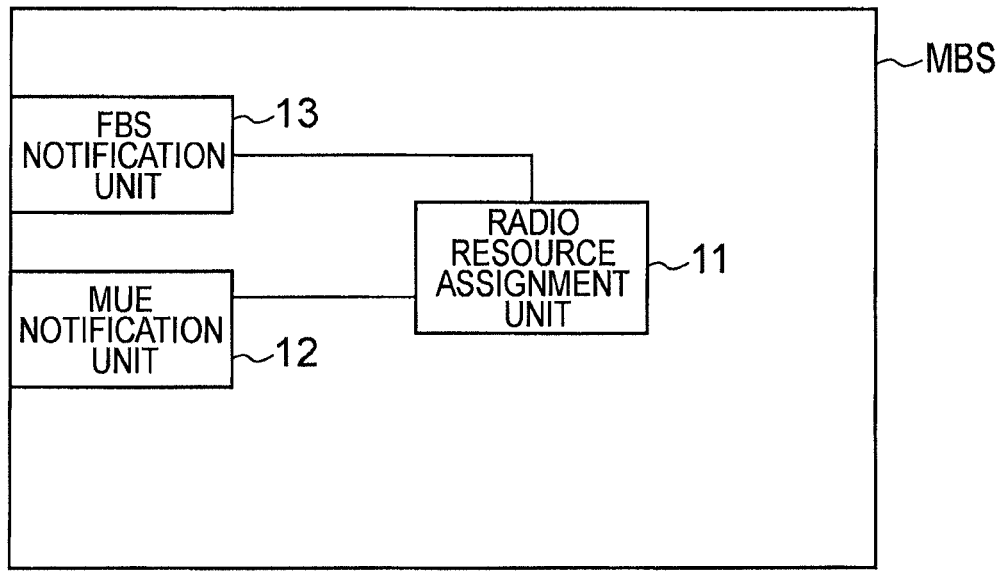
FIG. 2 is a functional block diagram of a macro radio base station according to the first embodiment of the present invention.

As illustrated in FIG. 2, the macro radio base station MBS includes a radio resource assignment unit 11, an MUE notification unit 12, and an FBS notification unit 13.

The radio resource assignment unit 11 is configured to assign a radio resource for a control channel through which downlink control information or uplink control information is transmitted to a first mobile station (hereinafter, referred to as "macro mobile station MUE") that is in communication in a macro cell (first cell) under the control of the macro radio base station MBS.

Further, the radio resource assignment unit 11 is configured to assign a radio resource for a PUSCH (Physical Uplink Shared Channel), i.e., an RB (Resource Block), as a radio resource for a data channel through which uplink data (transport block) is transmitted, to the macro mobile station MUE.

Moreover, the radio resource assignment unit 11 is configured to assign a radio resource for a PDSCH (Physical Downlink Shared Channel), i.e., a resource block, as the radio resource for a data channel through which the downlink data (transport block) is transmitted, to the macro mobile station MUE.

In this case, the mobile communication system according to this embodiment is configured such that HARQ retransmission control is applied to a PUSCH and a PDSCH, but the HARQ retransmission control is not adapted to a PUCCH, a PCFICH, a PHICH, and a PDCCH.

That is, in the mobile communication system according to this embodiment, even if it fails to receive downlink data transmitted via a PDSCH and uplink data transmitted via a PUSCH, it is possible to rescue these data by the HARQ retransmission control.

On the other hand, in the mobile communication system according to this embodiment, when it fails to receive the uplink control information transmitted via a PUCCH and the downlink control information transmitted via a PCFICH, a PHICH, and a PDCCH, these data are not rescued by the HARQ retransmission control.

For example, if the radio base station eNB fails to receive the uplink control information (CQI (Channel Quality Indicator)) transmitted via a PUCCH, ACK/NACK for the downlink data, and a scheduling request (SR: Scheduling Request, etc.), then AMC (Adaptive Modulation and Coding) control, transmission power control, HARQ retransmission control, and a radio resource assignment (scheduling) process cannot be appropriately performed, and as a result, a radio efficiency deteriorates.

Therefore, in the mobile communication system according to this embodiment, securing the quality of a control channel, i.e., inhibiting interference against the control channel, is considered important.

Specifically, the radio resource assignment unit 11 is configured to assign the radio resource for a PUCCH (Physical Uplink Control Channel) as a radio resource for a control channel through which the uplink control information is transmitted, to the macro mobile station MUE.

Figure 3:
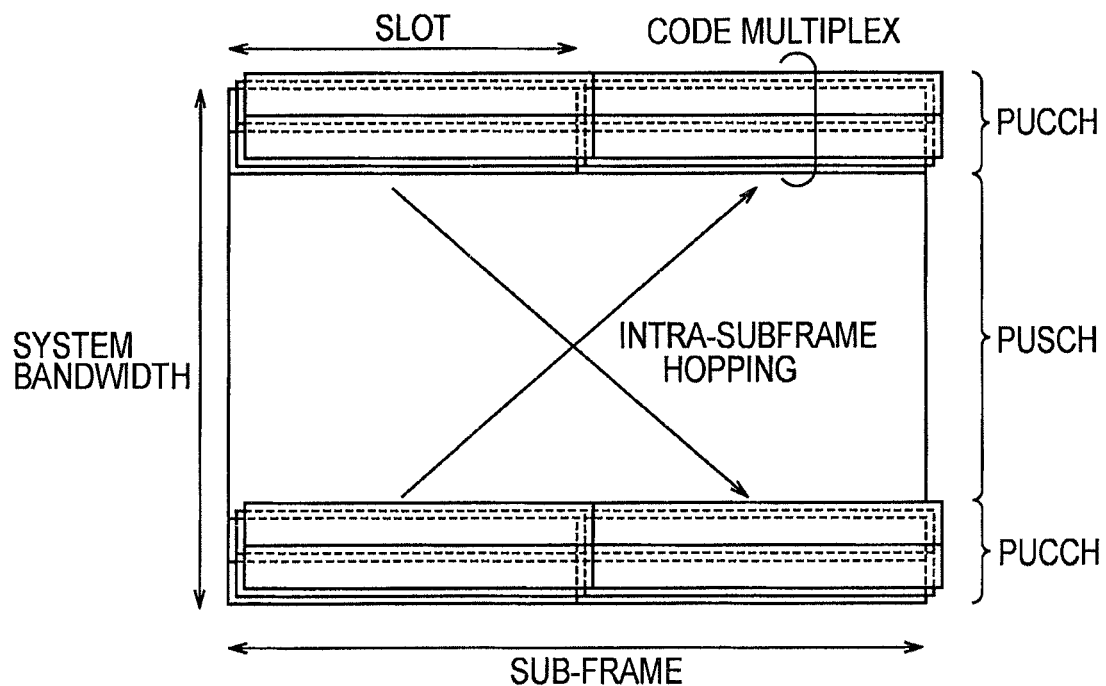
FIG. 3 is a diagram illustrating one example of a radio resource for a PUCCH and a radio resource for a PUSCH assigned by the macro radio base station according to the first embodiment of the present invention.
Figure 4:
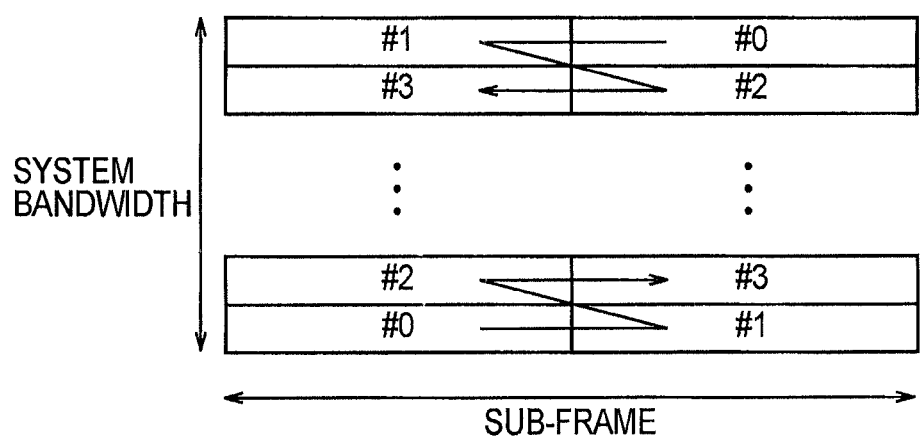
FIG. 4 is a diagram illustrating one example of a radio resource for a PUCCH and a radio resource for a PUSCH assigned by the macro radio base station according to the first embodiment of the present invention.

As illustrated in FIG. 3 and FIG. 4, the radio resource assignment unit 11 is configured to assign radio resources within a resource block at the both ends in a system bandwidth as the radio resource for a PUCCH, and a resource block inside this resource block as the radio resource for a PUSCH.

As illustrated in FIG. 3, it is configured such that a code multiplex is performed in the resource block for a PUCCH. Therefore, the radio resource for a PUCCH is specified by the resource block and the code. It is noted that the resource block is specified by an OFDM symbol or time resource and a sub-carrier or frequency resource.

Further, the radio resource assignment unit 11 is configured to determine a radio resource assigned to the macro mobile station MUE, by the "Intra-subframe hopping", as illustrated in FIG. 3, between a first half portion (slot) and a second half portion (slot) within a single sub-frame.

As illustrated in FIG. 4, a resource number is allotted to the resource block that can serve the radio resource for a PUCCH in a sequential manner from both ends of the system bandwidth; a radio resource of which the resource number is small is firstly assigned as the radio resource for a PUCCH through which CQI is transmitted; and then the rest of the radio resources is assigned as the radio resource for a PUCCH through which downlink ACK/NACK is transmitted and the radio resource for PUCCH through which SR is transmitted.

Moreover, the radio resource assignment unit 11 is configured to assign to the macro mobile station MUE a radio resource for a PCFICH (Physical Control Format Indicator Channel), a radio resource for a PHICH (Physical Hybrid ARQ Indicator Channel), and a radio resource for a PDCCH (Physical Downlink Control Channel), as the radio resource for a control channel through which the downlink control information is transmitted.

Figure 5:
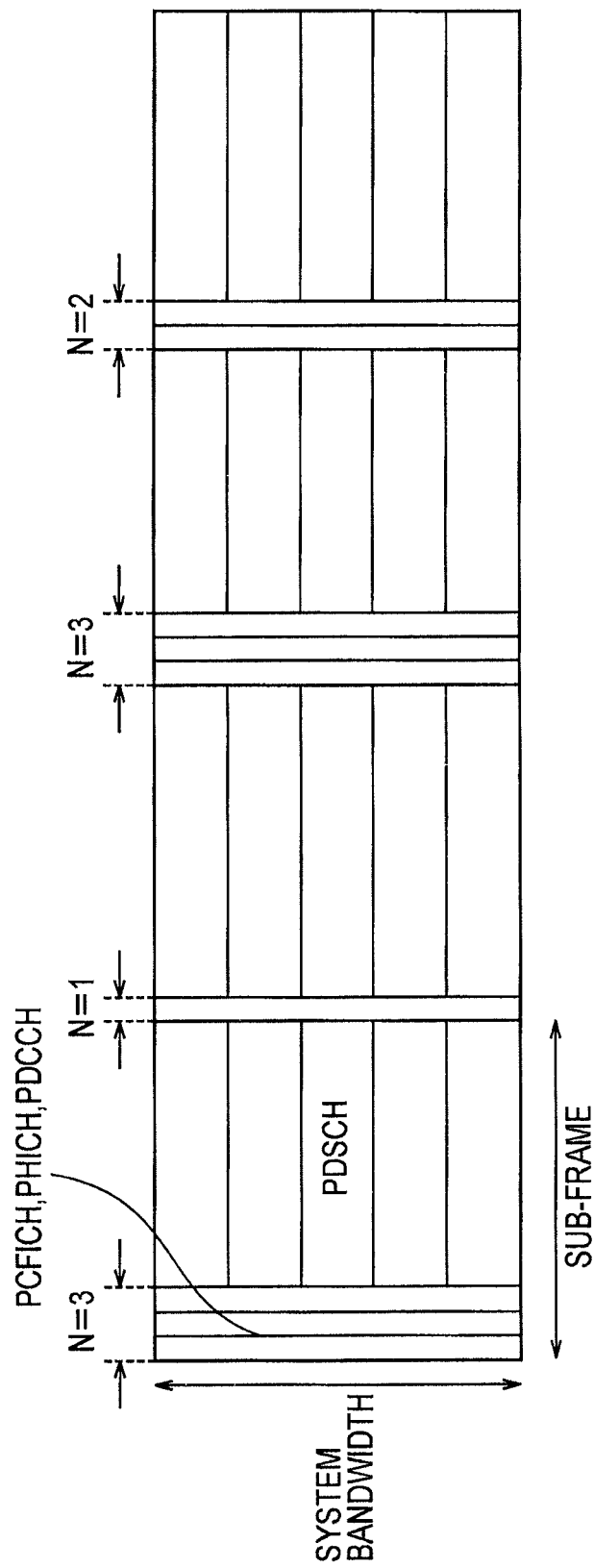
FIG. 5 is a diagram illustrating one example of a radio resource for a PCFICH, a radio resource for a PHICH, and a radio resource for a PDCCH assigned by the macro radio base station according to the first embodiment of the present invention.

As illustrated in FIG. 5, the radio resource assignment unit 11 is configured to assign radio resources within first to third forefront OFDM symbols within a single sub-frame as the radio resource for a PCFICH, the radio resource for a PHICH, and the radio resource for a PDCCH, and to assign the radio resources within the rest of the OFDM symbol as the radio resource for a PDSCH.

The PCFICH is a control channel through which information is transmitted for indicating the number of forefront OFDM symbols (one OFDM symbol to three OFDM symbols) within a single sub-frame to be assigned as the radio resource for a PCFICH, the radio resource for a PHICH, and the radio resource for a PDCCH.

The assignment position of the radio resource for a PCFICH is fixed. The radio resource for a PCFICH is configured to be assigned repeatedly four times in a frequency direction within forefront OFDM symbols within a single sub-frame. The position in a frequency direction is determined by cell identification information (PCI: Physical Cell ID) specifying each cell.

The PHICH is a control channel through which ACK/NACK for downlink data transmitted via a PUSCH to which the HARQ retransmission control is applied is transmitted. The radio resource for a PHICH is configured to be assigned repeatedly three times in a frequency direction within an OFDM symbol defined by a PCFICH.

Further, when the number of PHICH groups (the number of channels) and the number of OFDM symbols used in the radio resource for a PHICH are set, it is possible to adjust the capacity of the radio resource for a PHICH. These settings are configured to be notified by a MIB (Master Information Block) or broadcast information, from the radio base station eNB to the mobile station UE.

The PDCCH is a control channel used for notifying the radio resource for a PDSCH and assignment results (DL Grant and UL Grant) of the radio resource for a PUSCH.

It is configured such that as the radio resource for a PDCCH, a radio resource to which the radio resource for a PCFICH and the radio resource for a PHICH are not assigned is assigned, of the radio resource within the OFDM symbol defined by a PCFICH.

Moreover, in addition to notifying the assignment result of the dedicated radio resources (the radio resource for PDSCH, the radio resource for PUSCH, etc.) for each mobile station UE, a PDCCH is used also for transmitting information mapped to a BCCH (Broadcast Control Channel), information mapped to a PCCH (Paging Control Channel), an RA (Random Access) response, and a transmission power control command in a PUCCH and a PUSCH.

It is noted that a region to which the radio resource for a PDCCH can be assigned is divided into a small unit called "CCE (Control Channel Element)", and as a radio resource for each PDCCH, a radio resource including one, two, four, or eight CCEs is assigned. In this case, the number of CCEs is determined by "Aggregation Level" selected by a propagation environment, for example.

The number of PDCCHs that can be multiplexed within a single sub-frame is determined by the "Aggregation Level", the number of the OFDM symbols, and a setting content on a PHICH. Further, formats of a PDCCH can be various formats (Format 0/1/1a/1b/1c/1d/2/2a/3/3a) depending on the purpose.

The MUE notification unit 12 is configured to notify, to the macro mobile station MUE, the assignment result of the radio resource by the radio resource assignment unit 11. For example, the MUE notification unit 12 is configured to notify, to the macro mobile station MUE, the assignment results (DL Grant and UL Grant) of the radio resource for a PDSCH and the radio resource for a PUSCH, via a PDCCH.

The FBS notification unit 13 is configured to notify, to the femto radio base station FBS (second radio base station), the scheduling information including the assignment result of the radio resource (information specifying this radio resource) by the radio resource assignment unit 11.

For example, the FBS notification unit 13 may be configured to notify, to the femto radio base station FBS, scheduling information including the number of OFDM symbols notified by a PCFICH and the content of "PHICH-Configuration" (setting content on a PHICH), illustrated in FIG. 6, as the assignment result of the radio resource (information specifying this radio resource) by the radio resource assignment unit 11.

It is noted that the FBS notification unit 13 may be configured to notify, to the femto radio base station FBS, scheduling information including an assignment result of the SRS (Sounding Reference Signal) in the uplink, an assignment result of "Semi-Persistent Scheduling Resource", etc., as the assignment result of the radio resource by the radio resource assignment unit 11 (information specifying this radio resource).

Hereinafter, with reference to FIG. 7, the configurations of the femto radio base stations FBS1 to FBS3 will be explained. In this case, the femto radio base stations FBS1 to FBS3 are basically the same in configuration, and are explained collectively as the femto radio base station FBS (second radio base station), below.

Figure 7:
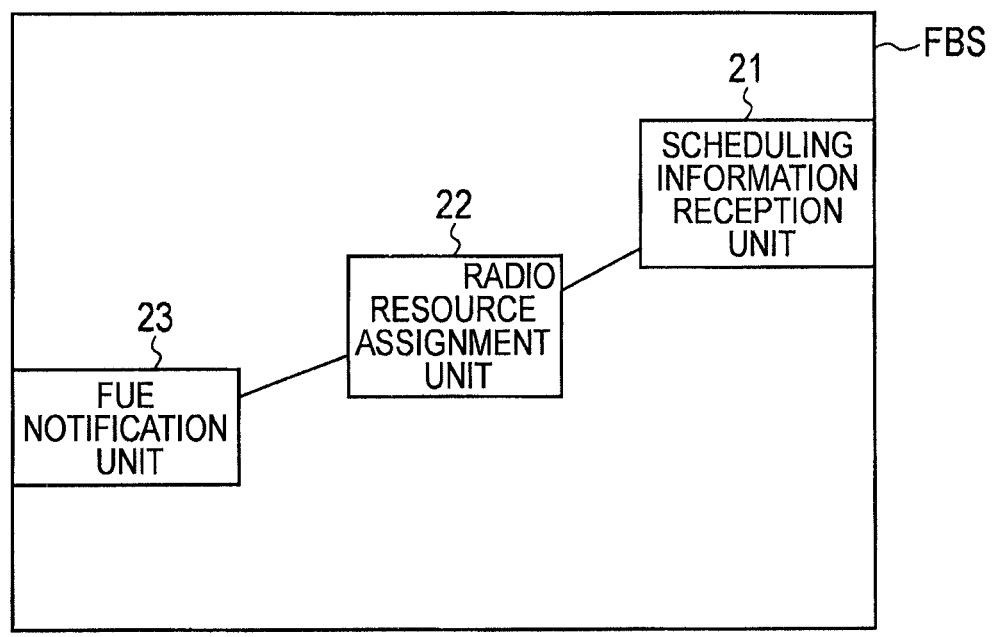
FIG. 7 is a functional block diagram of a femto radio base station according to the first embodiment of the present invention.

As illustrated in FIG. 7, the femto radio base station FBS includes a scheduling information reception unit 21, a radio resource assignment unit 22, and an FUE notification unit 23.

The scheduling information reception unit 21 is configured to receive scheduling information transmitted by the macro radio base station MBS.

The radio resource assignment unit 22 is configured to assign the radio resource for a PUSCH, i.e., the resource block, to the second mobile station (hereinafter, referred to as "femto mobile station FUE") that is in communication in the femto cell (second cell) under, as the radio resource for a data channel through which the uplink is transmitted.

Further, the radio resource assignment unit 22 is configured to assign the radio resource for a PDSCH, i.e., the resource block, to the femto mobile station FUE, as the radio resource for a data channel through which downlink data is transmitted.

Further, the radio resource assignment unit 22 is configured to assign the radio resource for a control channel through which the femto mobile station FUE transmits the downlink control information or the uplink control information, based on the scheduling information received by the scheduling information reception unit 21.

Specifically, the radio resource assignment unit 22 is configured to assign the radio resource for a PUCCH to the macro mobile station MUE as the radio resource for a control channel through which the uplink control information is transmitted.

Moreover, the radio resource assignment unit 22 is configured to assign the radio resource for a PCFICH, the radio resource for a PHICH, and the radio resource for a PDCCH to the macro mobile station MUE as the radio resource for a control channel through which the downlink control information is transmitted.

It is noted that each mobile station UE is configured to perform "blind detection" in order to receive the downlink control information destined to each mobile station UE via a PDCCH. However, there are too many combinations of "Aggregation Level" or "format of a PDCCH", and thus, a region in which the radio resource for a PDCCH destined to the mobile station UE should be searched, i.e., a region to be merely searched, for receiving the downlink control information, is limited for each mobile station UE in order to decrease a processing amount in each mobile station UE.

Figure 8:
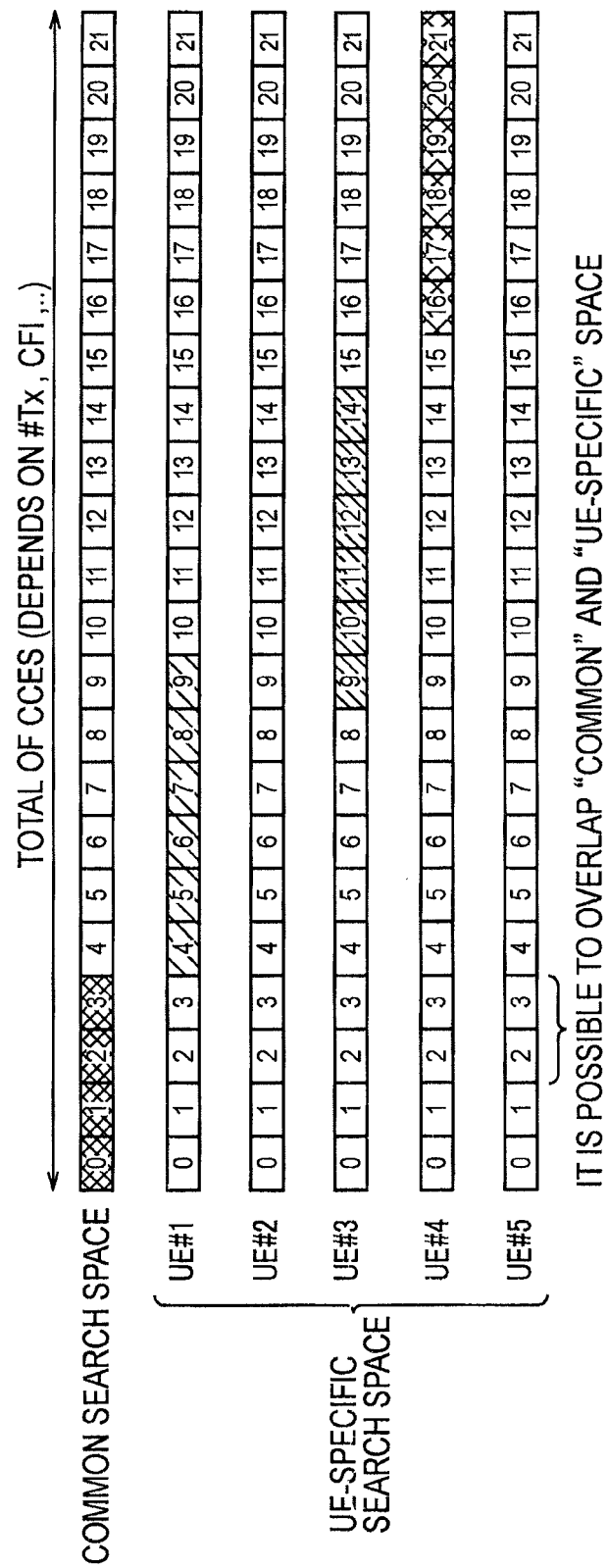
FIG. 8 is a diagram explaining "UE-specific Search Space" used in a mobile communication system according to the first embodiment of the present invention.

Specifically, as illustrated in FIG. 8, each mobile station UE may suffice to perform "blind detection" only on "Common Search Space" and "UE-Specific Search Space" for each mobile station UE, i.e., the radio resource for a PDCCH may be searched only in "Common Search Space" and "UE-Specific Search Space" for each mobile station UE.

That is, each mobile station UE may suffice to perform "blind detection" in a particular CCE, by using a combination of "Aggregation Level" or "format of a PDCCH" of a particular pattern.

It is noted that the "Common Search Space" is defined in the 3GPP standard TS36.213, and is a region in which the radio resource for a PDCCH for transmitting the information mapped to a BCCH, the information mapped to a PCCH, the RA response, etc., should be searched in all the mobile stations UE.

On the other hand, the "UE-Specific Search Space" for each mobile station UE is defined in the 3GPP standard TS36.213, and is determined by UE-ID (C-RNTI: Cell-Radio Network Temporary Identity) specifying each mobile station UE.

In this case, the radio resource assignment unit 22 may be configured to assign the above-described radio resource so that the region (UE-Specific Search Space) in which the macro mobile station MUE searches for receiving the downlink control information and the region (UE-Specific Search Space) in which the femto mobile station FUE searches for receiving the downlink control information do not overlap.

(Operation of the Mobile Communication System According to the First Embodiment of the Present Invention)

Figure 9:
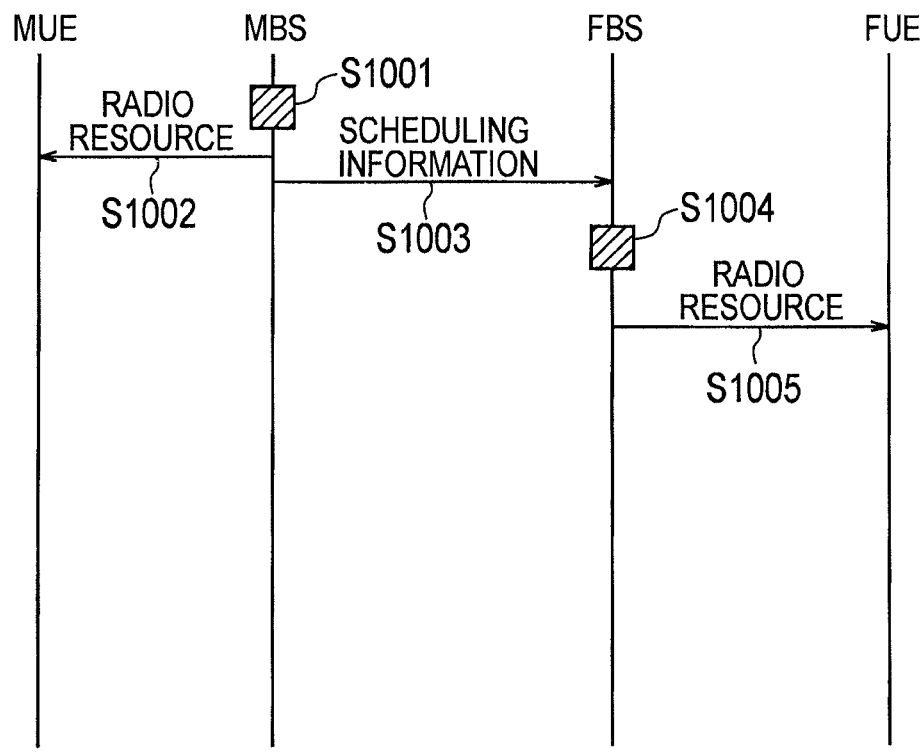
FIG. 9 is a sequence chart illustrating an operation of the mobile communication system according to the first embodiment of the present invention.
Figure 10:
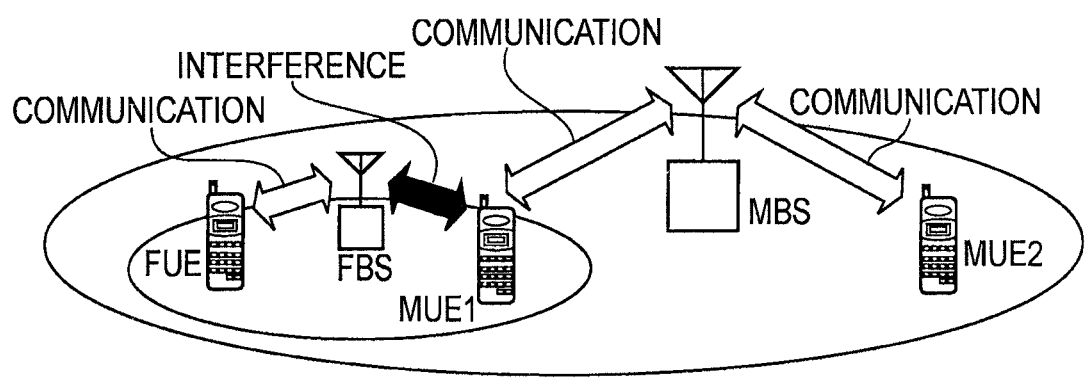
FIG. 10 is a diagram explaining problems inherent in a conventional mobile communication system.

With reference to FIG. 9, the operation of the mobile communication system according to the first embodiment of the present invention will be explained.

As illustrated in FIG. 9, in step S1001, the macro radio base station MBS assigns the radio resource for a control channel through which the downlink control information and the uplink control information are transmitted, to the macro mobile station MUE.

In step S1002, the macro radio base station MBS notifies, to the macro mobile station MUE, the radio resource via a PDCCH, and in step S1003, notifies, to the femto radio base station FBS, the scheduling information including the information specifying the radio resource.

In step S1004, the femto radio base station FBS assigns the radio resource for a control channel through which the downlink control information and the uplink control information are transmitted, to the femto mobile station FUE.

In this case, the femto radio base station FBS assigns the above-described radio resource so that the "UE-Specific Search Space" of the macro mobile station MUE and the "UE-Specific Search Space" of the femto mobile station FUE do not overlap.

In step S1005, the femto radio base station FBS notifies, to the femto mobile station FUE, the radio resource via a PDCCH.

(Operation and Effect of the Mobile Communication System According to the First Embodiment of the Present Invention)

Based on the mobile communication system according to the first embodiment of the present invention, the macro radio base station MBS can notify, to the femto radio base station FBS, the scheduling information, and thus, it is possible to effectively decrease the interference in the femto radio base station FBS.

The above-mentioned characteristics of the embodiment may be expressed as follows:

A first aspect of this embodiment is summarized as a mobile communication method which includes the steps of: (A) notifying, from a macro radio base station MBS (first radio base station) to a femto radio base station FBS (second radio base station), scheduling information including information specifying a radio resource for a control channel through which a macro mobile station MUE (first mobile station) that is in communication in a macro cell (first cell) under the control of the macro radio base station MBS transmits downlink control information or uplink control information, when a macro radio base station MBS (first radio base station) assigns the radio resource; and (B) assigning, at the femto radio base station FBS, a radio resource for a control channel through which a femto mobile station FUE (second mobile station) that is in communication in a femto cell (second cell) under the control of the femto radio base station FBS transmits downlink control information or uplink control information based on the scheduling information.

In the first aspect of the embodiment, in the step (B), the femto radio base station FBS may assign the above-described radio resource so that a region (UE-Specific Search Space) in which the macro mobile station MUE searches for receiving the downlink control information and a region (UE-Specific Search Space) in which the femto mobile station FUE searches for receiving the downlink control information do not overlap.

In the first aspect of the embodiment, the mobile communication method may be used in a mobile communication system of an LTE scheme, the control channel through which the uplink control information is transmitted may include a PUCCH, and the control channel through which the downlink control information is transmitted may include a PDCCH.

A second aspect of the embodiment is summarized as a radio base station that functions as a macro radio base station MBS in a mobile communication system in which the macro radio base station MBS and a femto radio base station FBS are mixed and includes: a radio resource assignment unit 11 configured to assign a radio resource for a control channel through which downlink control information or uplink control information is transmitted to the macro mobile station MUE that is in communication in a macro cell under the control of the macro radio base station MBS; and a notification unit 13 configured to notify, to the femto radio base station FBS, scheduling information including information specifying the radio resource assigned by the radio resource assignment unit 11.

A third aspect of the embodiment is summarized as a radio base station that functions as a femto radio base station FBS in a mobile communication system in which a macro radio base station MBS and the femto radio base station FBS are mixed and the macro radio base station MBS includes: a scheduling information reception unit 21 configured to receive, when the macro mobile station MUE that is in communication in a macro cell under the control of the macro radio base station MBS assigns a radio resource for a control channel through which downlink control information or uplink control information is transmitted, the scheduling information including information specifying the radio resources from the macro radio base station MBS; and a radio resource assignment unit 22 configured to assign a radio resource for a control channel through which the femto mobile station FUE that is in communication in a femto cell under the control of the femto radio base station FBS transmits downlink control information or uplink control information based on the scheduling information.

In the third aspect of the embodiment, the radio resource assignment unit 22 may be configured to assign the above-described radio resource so that a region (UE-Specific Search Space) in which the macro mobile station MUE searches for receiving the downlink control information and a region (UE-Specific Search Space) in which the femto mobile station FUE searches for receiving the downlink control information do not overlap.

In the second aspect and the third aspect of the embodiment, the mobile communication system may be a mobile communication system of an LTE scheme, the control channel through which the uplink control information is transmitted may include a PUCCH, and the control channel through which the downlink control information is transmitted may include a PDCCH.

The operation of the above-described macro radio base station MBS, the femto radio base station FBS, the macro mobile station MUE and the femto mobile station FUE may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the macro radio base station MBS, the femto radio base station FBS, the macro mobile station MUE and the femto mobile station FUE. As a discrete component, such a storing medium and processor may be arranged in the macro radio base station MBS, the femto radio base station FBS, the macro mobile station MUE and the femto mobile station FUE.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile communication method, comprising the steps of:
   (A) notifying, from a first radio base station to a second radio base station, scheduling information including information specifying a radio resource for a control channel through which a first mobile station that is in communication in a first cell under the control of the first radio base station transmits downlink control information or uplink control information, when the first radio base station assigns the radio resource; and
   (B) assigning, at the second radio base station, a radio resource for a control channel through which a second mobile station that is in communication in a second cell under the control of the second radio base station transmits downlink control information or uplink control information based on the scheduling information, the second cell being a closed subscriber group cell,
   wherein in the step (B), the second radio base station assigns the radio resource so that a region in which the first mobile station searches for receiving the downlink control information and a region in which the second mobile station searches for receiving the downlink control information do not overlap.

2. The mobile communication method according to claim 1, wherein
   the mobile communication method is a mobile communication method used in a mobile communication system of an LTE (Long Term Evolution) scheme,
   the control channel through which the uplink control information is transmitted includes a PUCCH (Physical Uplink Control Channel), and
   the control channel through which the downlink control information is transmitted includes a PDCCH (Physical Downlink Control Channel).

3. A radio base station that functions as a first radio base station in a mobile communication system in which the first radio base station and a second radio base station are mixed, the first radio base station having a processor, the processor comprising:
   a radio resource assignment unit for assigning a radio resource for a control channel through which downlink control information or uplink control information is transmitted to the first mobile station that is in communication in a first cell under the control of the first radio base station; and a notification unit for notifying, to the second radio base station, scheduling information including information specifying the radio resource assigned by the radio resource assignment unit, the second base station functioning in a closed subscriber group cell.

4. A radio base station that functions as a second radio base station in a mobile communication system in which a first radio base station and the second radio base station are mixed, the second radio base station having a processor, the processor comprising:

a scheduling information reception unit for receiving scheduling information including information specifying a radio resource from the first radio base station, when the first radio base station assigns a radio resource for a control channel through which the first mobile station that is in communication in a first cell under the control of the first radio base station transmits downlink control information or uplink control information; and a radio resource assignment unit for assigning a radio resource for a control channel through which the second mobile station that is in communication in a second cell under the control of the second radio base station transmits downlink control information or uplink control information, based on the scheduling information, the second cell being a closed subscriber group cell, wherein the radio resource assignment unit is for assigning the radio resource so that a region in which the first mobile station searches for receiving the downlink control information and a region in which the second mobile station searches for receiving the downlink control information do not overlap.

5. The radio base station according to claim 4, wherein the mobile communication system is a mobile communication system of an LTE (Long Term Evolution) scheme, the control channel through which the uplink control information is transmitted includes a PUCCH (Physical Uplink Control Channel), and the control channel through which the downlink control information is transmitted includes a PDCCH (Physical Downlink Control Channel).

6. The radio base station according to claim 3, wherein the mobile communication system is a mobile communication system of an LTE (Long Term Evolution) scheme, the control channel through which the uplink control information is transmitted includes a PUCCH (Physical Uplink Control Channel), and the control channel through which the downlink control information is transmitted includes a PDCCH (Physical Downlink Control Channel).

\* \* \* \* \*